(Model.)
E. NICHOLSON.
KNIFE BLADE HOLDER.
No. 332,548. Patented Dec. 15, 1885.
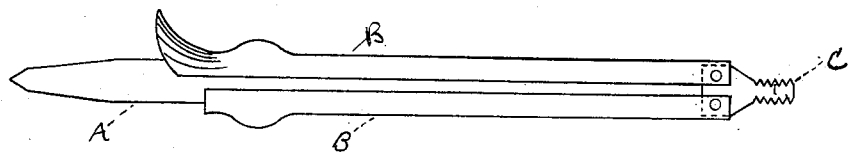
Fig: 1.
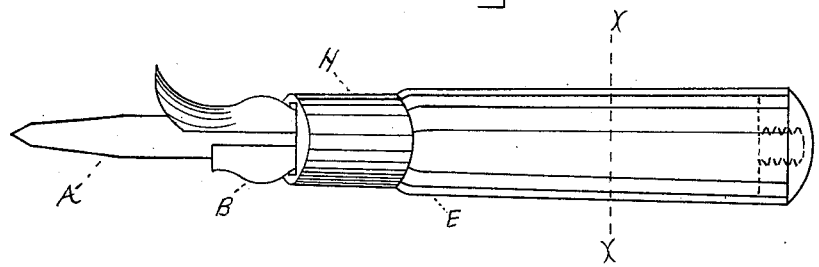
Fig: 2.
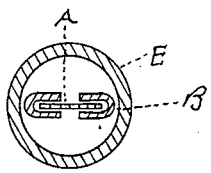
Fig: 3.
Witnesses.
Chas. E. Payne
C. C. Tuttle
Inventor.
Ezekiel Nicholson
By
O. B. Tuttle,
Att'y

UNITED STATES PATENT OFFICE.

EZEKIEL NICHOLSON, OF LYNN, MASSACHUSETTS, ASSIGNOR TO ALFRED A. MOWER, TRUSTEE, OF SAME PLACE.

KNIFE-BLADE HOLDER.

SPECIFICATION forming part of Letters Patent No. 332,548, dated December 15, 1885.

Application filed March 20, 1885. Serial No. 159,544. (Model.)

*To all whom it may concern:*

Be it known that I, EZEKIEL NICHOLSON, of Lynn, in the county of Essex and Commonwealth of Massachusetts, have invented certain Improvements in Shoe-Knife-Blade Holders, of which the following, taken in connection with the accompanying drawings, is a specification.

Referring to the drawings, Figure 1 is a side elevation of the knife-blade and its holding-jaws. Fig. 2 illustrates the same in combination with the handle. Fig. 3 is a cross-section of Fig. 2, made on line $x\ x$.

My invention is an improvement on Letters Patent of the United States No. 51,297, and has for its object to provide a handle that may be more readily combined with the holding-jaws and also cheaper to construct and manufacture.

The invention consists in certain details of construction, hereinafter fully described, and specifically pointed out in the claims.

By reference to Fig. 1 it will be observed that the blade A is grasped by the holding-jaws B, to the end of which jaws is secured a screw, C. In these respects the blade and jaws of my knife are identical with those described in said Letters Patent No. 51,297; but it will be further observed that the clamp is provided with a finger-rest formed by turning up and opening out the end of the clamp, as shown, (see Fig. 1,) and in this respect my invention differs from the one referred to in said patent.

By reference to Fig. 3 it will be seen that the knife-handle E is provided with a central circular bore extending longitudinally into the same, and in this respect my handle differs from the one described in the above-mentioned patent.

The handle described and made use of in the Letters Patent No. 51,297 is provided with a rectangular hole extending longitudinally into the same to receive the holding-jaws, and is formed to correspond or conform to the shape of the jaws approximately. It was necessary to so construct the handle in order to prevent the jaws from turning and working loose while the knife is in use; but such construction is dispensed with in my handle, and hence the cost of making the handle is greatly reduced. In that case, too, the handle is provided with a nut arranged to turn loosely in the end of the handle and receive the screw end of the holding-jaws, and by turning this nut the jaws are drawn into the handle and the walls of the handle tightened about the jaws to clamp the blade. The turning of the nut was to be effected by a key whenever it was desirable to change the adjustment of the blade.

In my invention the end of the handle has a screw-threaded socket which takes the place of the nut described, and of course whenever the handle is turned the jaws are adjusted.

My handle is further provided with a ferrule or cap, H. Said cap is provided with a slot to allow the introduction of the holding-jaws, as shown, and it is also fitted loosely over the end of the handle, so that the handle may be turned while the cap and holding-jaws are held stationary. This operation draws the holding-jaws into the handle, forcing the edges of the clamps or jaws into contact with the edges of the cap, thus securely clamping the blade. Of course, a reverse movement of the handle releases the blade. This operation, it will be observed, may be effected without the use of any key. To prevent the cap from being forced too far onto the handle, it may be allowed to bear against a shoulder cut in the handle, or the handle may be allowed to extend forward and bear against the inner front face of the cap. The slot in the cap is formed, of course, to correspond approximately to the shape of the holding-jaws, as shown, and thus the jaws and blade are prevented from working loose or to one side while the knife is being used.

It will be understood that the application of my invention is not restricted to any particular kind or class of knife-blades, as the shape of the clamping-jaws and the ferrule may be greatly varied to suit the requirements of the blade with which they are intended to be used without departing from the spirit of my invention.

Having thus described my invention, I claim—

1. The knife-blade holder, consisting of a handle having a screw-threaded socket at one end, clamps B, adapted to hold the knife-blade, the said clamps having a screw-threaded extension fitting the screw-threaded socket in the handle and a loosely-fitting ferrule on the opposite end of the handle adapted to hold the clamps, all substantially as described.

2. In combination with the handle formed as described, the clamps B, provided with the finger-rest integral with one of them, constructed substantially as described.

EZEKIEL NICHOLSON.

Witnesses:
 C. B. TUTTLE,
 C. C. TUTTLE.